(12) United States Patent
Allen (10) Patent No.: US 8,213,793 B2
(45) Date of Patent: Jul. 3, 2012

(54) WAVELENGTH ASSIGNMENT OPTIMIZATION

(75) Inventor: John D. Allen, Garland, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 586 days.

(21) Appl. No.: 11/863,543

(22) Filed: Sep. 28, 2007

(65) Prior Publication Data
US 2009/0087180 A1 Apr. 2, 2009

(51) Int. Cl.
*H04J 14/00* (2006.01)

(52) U.S. Cl. ........ 398/48; 398/45; 398/47; 398/49; 398/50; 398/25; 370/229; 370/237; 370/351

(58) Field of Classification Search ........ 398/25, 398/45–50; 370/221–258, 395
See application file for complete search history.

(56) References Cited

U.S. PATENT DOCUMENTS

| | | | |
|---|---|---|---|
| 6,205,117 B1 * | 3/2001 | Doshi et al. | 370/228 |
| 7,466,913 B2 * | 12/2008 | Saniee et al. | 398/3 |
| 2003/0099014 A1 * | 5/2003 | Egner et al. | 359/124 |
| 2003/0147645 A1 * | 8/2003 | Imajuku et al. | 398/7 |
| 2003/0169692 A1 * | 9/2003 | Stern et al. | 370/242 |
| 2005/0069314 A1 * | 3/2005 | De Patre et al. | 398/5 |
| 2005/0147081 A1 * | 7/2005 | Acharya et al. | 370/351 |
| 2005/0237950 A1 * | 10/2005 | Yuan et al. | 370/255 |
| 2006/0067694 A1 * | 3/2006 | Nozu | 398/83 |

OTHER PUBLICATIONS

Thomas E. Stern et al., "Multiwavelength Optical Networks: A Layered Approach", section 6.3.7 entitled "RCA as an Optimization Problem", pp. 404-410, Prentice-Hall, Inc., 2000.

* cited by examiner

*Primary Examiner* — Li Liu (57) ABSTRACT

A method may include inputting parameters that characterize an optical network, inputting one or more demands to be routed, selecting routes, wavelengths, and wavelength translation nodes simultaneously for the one or more demands of the optical network based on the parameters, where each demand includes a working path and one or more protect paths, and configuring the optical network based on the selected routes, wavelengths, and wavelength translation nodes associated with the one or more demands.

19 Claims, 5 Drawing Sheets

WAVELENGTH ASSIGNMENT OPTIMIZATION

BACKGROUND

In an optical network, route selection and wavelength selection are fundamental considerations in satisfying the demands of the network. In some instances, the same wavelength may be used along the entire length of a route associated with a demand. In other instances, the same wavelength may not be used along the entire length of a route because of contention issues. For example, multiple demands on a given link may generate contention. In some circumstances, translating one or more of the wavelengths or selecting a different route may resolve this convention. However, these types of ad hoc implementations may be costly from a local or a network-wide standpoint.

DETAILED DESCRIPTION OF PREFERRED EMBODIMENTS

The following detailed description refers to the accompanying drawings. The same reference numbers in different drawings may identify the same or similar elements. Also, the following description does not limit the invention.

Figure 1:
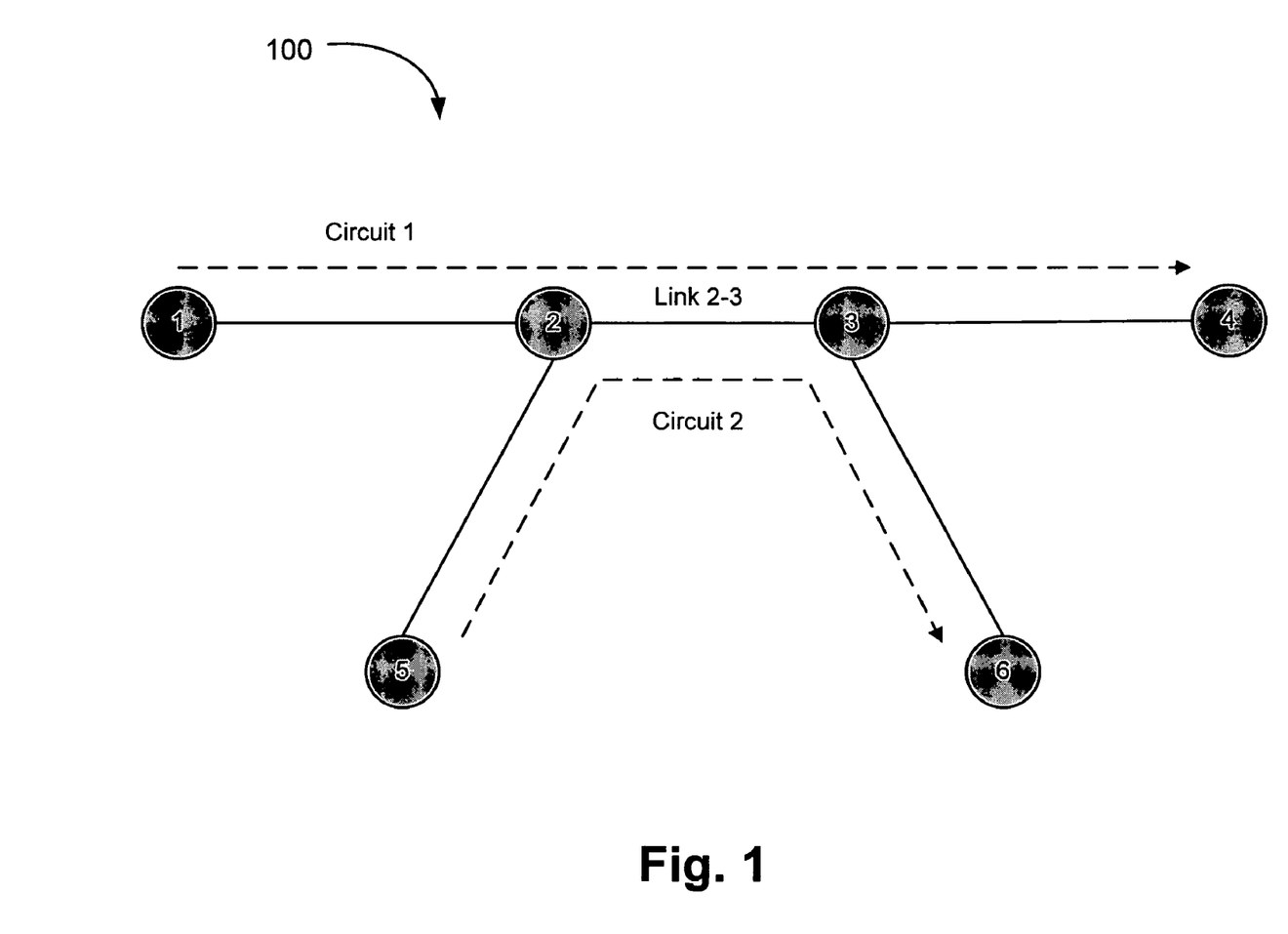
FIG. 1 is a diagram illustrating a concept 100 described herein.

FIG. 1 is a diagram illustrating a concept 100 described herein. As illustrated, an exemplary network topology may include multiple nodes, such as nodes 1-6, and two circuits, such as circuits 1 and 2. Circuit 1 may be utilizing the same wavelength as circuit 2, which will cause contention on link 2-3. Various possibilities exist to resolve this contention, each of which may add cost to the network.

For example, one way to resolve the contention would be to translate the wavelength at nodes 2 and 3 for circuit 1 or circuit 2. However, node 2 and/or node 3 may not provide wavelength translation capability. Alternatively, it may be possible to select a different route so that contention on link 2-3 may be avoided. However, the different route may be a longer and/or a more expensive route. Another possible solution would be to add an additional fiber to link 2-3. However, this solution may not be deployed in an ad hoc manner. Further, adding an additional fiber to link 2-3 may result in further cost.

Although each of the approaches described above may resolve the contention, poor selections associated with resolving contention may create additional contention and cost. For example, in practice, when fiber capacity is plentiful and future demands uncertain, wavelengths and routes may be selected based on what can be expediently provisioned versus long-term network impact. Unfortunately, as traffic increases and poor wavelength and/or route choices accumulate, contention may increase. In this regard, an approach that selects routes, wavelengths, and wavelength translation for each demand having a working path and one or more protect paths while minimizing overall network cost would be beneficial.

Described below is an approach for providing routing, wavelength assignment, and wavelength translation determinations for working and protect paths of a demand. This approach may be applied to new network designs (e.g., to a new network), incremental network changes (e.g., to an existing network), as well as other possible applications, as will be described herein.

This approach may be distinguishable from other approaches because routing, wavelength assignment and wavelength translation may be solved simultaneously for both working and protect paths. In this way, optimal redundancy for all demands within a network may be achieved. Additionally, the approach may provide for wavelength consistency. For example, on both a working path and a protect path (e.g., a back-up path), the same wavelength that leaves the source node may arrive at the destination node, regardless of the number of wavelength translations that occur along the route. Further, any user-specified wavelength assignments may be preserved. For example, when this approach is applied to an already existing network, wavelength assignment of a first link from the source node and a last link to the destination node may be preserved, while intermediary links may be optimized. Additionally, the approach may include a pre-processing procedure for determining wavelength assignments based on demand disjointedness. Still further, the approach as described herein may provide significant savings compared to ad-hoc implementations.

As set forth below, a model formulation and a Mixed Integer Program (MIP) are described. In one implementation, the MIP may be executed by one or more processors from software instructions contained in a computer-readable medium, such as a memory. A computer-readable medium may be defined as a physical or logical memory device and/or carrier wave. In one implementation, the MIP program may be executed on a computer. The model formulation may be entered into the MIP. The model formulation may include the following.

For a given network environment, we may consider the following:

N=set of network nodes $N^t$=set of nodes where wavelength translation can occur, $N^t \subset N$ L=set of (directed) physical links in the network D=set of end-to-end (directed) demands, 1 wavelength per demand $\Lambda$=set of <demand, wavelength> pairs showing demands that have pre-assigned wavelengths at the origin and destination nodes W=set of possible wavelength numbers on a fiber (e.g., 1, 2, ..., $\lambda_{max}$);

$c_l$=fiber cost for link l $c^t$ cost to translate a wavelength at a node $\lambda_{max}$=maximum number of wavelengths per fiber.

The following may be determined in pre-processing:

$P_d$=set of paths between the origin and destination nodes of demand d, where each path p includes of one or more links l P=set of all paths, i.e., $$P = \bigcup_{d \in D} P_d$$

$L_p$=set of links used in path p, $L_p \subset L$ $N_p$=set of nodes used in path p, $N_p \subset N$ The following decision variables (all non-negative) may be used:

$\delta_p^W$=1 if path p is used as a working path, 0 if not. Note that path p may correspond to only one demand (Boolean)

$\delta_p^R$=1 if path p is used as a protect path (e.g., dedicated restoration), 0 if not. Note that path p may correspond to only one demand (Boolean)

$a_{pwl}$=1 if link l uses wavelength w to carry a demand on path p, 0 if not (Boolean)

$f_l$=number of fibers needed on link l (integer)

$\Delta^+_{pn}$=positive difference between path p's wavelength number coming in to node n and the wavelength number leaving node n (real)

$\Delta^-_{pn}$=negative difference between path p's wavelength number coming in to node n and the wavelength number leaving node n (real)

$\chi_{pn}$=1 if path p's wavelength changed at node n, 0 if not (Boolean).

The following variable definitions may be used:

$l_{xy}$=directed link from node x to node y, where $l_{xy} \in L$ $p_{origin}$=origin node of path p $p_{dest}$=destination node of path p.

Given the model formulation above, the MIP may perform several calculations simultaneously. For example, the MIP may minimize fiber and translation costs, and manage wavelength assignment. This may be expressed as:

$$\text{Minimize} \sum_{l \in L} f_l c_l + \sum_{p \in P} \sum_{n \in N^t} \chi_{pn} c^t \quad (1)$$

subject to:

The MIP may also assign any user-specified wavelengths to demand origin node, where $a_{pwl}$ is set to 1 iff path p uses a wavelength w on link l. This may be expressed as:

$$a_{pwl_{xy}} = \delta_p^W + \delta_p^R \ \forall <d,w> \in \Lambda, \ \forall p \in P_d, \ \forall l_{xy} \in L_p: x = p_{origin} \quad (2)$$

The MIP may mark a path as "in use" if the path's link carries a wavelength, and may assign a wavelength to each link in active paths. This may be expressed as:

$$\sum_{w \in W} a_{pwl_{xy}} = \delta_p^W + \delta_p^R \ \forall p \in P, \ \forall l_{xy} \in L_p \quad (3)$$

The MIP may assign two diverse paths to each demand, where a working path may be shorter than a protect path. This may be expressed as:

$$\delta_p^W + \delta_p^R \leq 1 \ \forall p \in P \quad (4a)$$

$$\sum_{p \in P_d} \delta_p^W = 1 \ \forall d \in D \quad (4b)$$

$$\sum_{p \in P_d} \delta_p^R = 1 \ \forall d \in D \quad (4c)$$

$$\sum_{p \in P_d} \delta_p^W \text{Length}(p) \leq \sum_{p \in P_d} \delta_p^R \text{Length}(p) \ \forall d \in D \quad (4d)$$

The MIP may ensure that the same wavelength is used at source and destination nodes for each demand. This may be expressed as:

$$a_{pwl_{ox}} = a_{pwl_{yz}} \quad (5)$$

$$\forall p \in P, \ \forall w \in W,$$

$$l_{ox}, l_{yz} \in L_p: o = p_{origin}, z = p_{dest}$$

The MIP may ensure that the same wavelength is used on either side of transit non-translating nodes. This may be expressed as:

$$a_{pwl_{xn}} = a_{pwl_{ny}} \quad (6)$$

$$\forall p \in P, \ \forall w \in W, \ \forall l_{xn},$$

$$l_{ny} \in L_p: x \neq p_{origin}, y \neq p_{dest}, n \notin N^t$$

The MIP may ensure that there is one link and one wavelength in and out of each transit translation node in a path (conservation of flow). This may be expressed as:

$$\sum_{w \in W} a_{pwl_{xn}} = \delta_p \ \forall p \in P, \ \forall l_{xn} \in L_p: n \in N^t, x \neq p_{origin} \quad (7)$$

$$\sum_{w \in W} a_{pwl_{ny}} = \delta_p \ \forall p \in P, \ \forall l_{ny} \in L_p: n \in N^t, y \neq p_{dest} \quad (8)$$

The MIP may ensure link diversity in a demand's chosen paths. This may be expressed as:

$$\sum_{p \in P_d} \sum_{w \in W} a_{pwl_{xy}} \leq 1 \ \forall d \in D, \ \forall l_{xy} \in L \quad (9)$$

The MIP may identify changes in wavelength at transit translation nodes in a path (i.e., wavelength number in−wavelength number out). This may be expressed as:

$$\sum_{w \in W} \sum_{l_{xn} \in L} a_{pwl_{xn}} w - \sum_{w \in W} \sum_{l_{ny} \in L} a_{pwl_{ny}} w = \Delta^+_{pn} - \Delta^-_{pn} \ \forall p \in P, \quad (10)$$

$$\forall n \in N^t: n \neq p_{origin}, n \neq p_{dest}$$

$$\Delta^+_{pn} \leq \lambda_{max} \chi_{pn} \ \forall p \in P, \ \forall n \in N^t : n \neq p_{origin}, n \neq p_{dest} \quad (11)$$

$$\Delta^-_{pn} \leq \lambda_{max} \chi_{pn} \ \forall p \in P, \ \forall n \in N^t : n \neq p_{origin}, n \neq p_{dest} \quad (12)$$

The MIP may calculate the number of fibers needed per link=maximum number of times a wavelength is used on a link. This may be expressed as:

$$\sum_{p \in P} a_{pwl_{xy}} \leq f_{l_{xy}} \ \forall w \in W, \ \forall l_{xy} \in L \quad (13)$$

The MIP may calculate one wavelength per connection and demand on a link. This may be expressed as:

$$\sum_{w \in W} a_{pwl_{xy}} \leq 1 \quad \forall\, p \in P, \forall\, l_{xy} \in L \quad (14)$$

The MIP may prevent a link to carry a wavelength unless the link is a link of a path. This may be expressed as:

$$a_{pwl_{xy}} \leq \begin{cases} 1 & \text{if } l_{xy} \in L_p \\ 0 & o.w. \end{cases} \quad \forall\, p \in P, \forall\, w \in W, \forall\, l_{xy} \in L \quad (15)$$

The MIP may express all variables as non-negative. (16)

Figure 2:
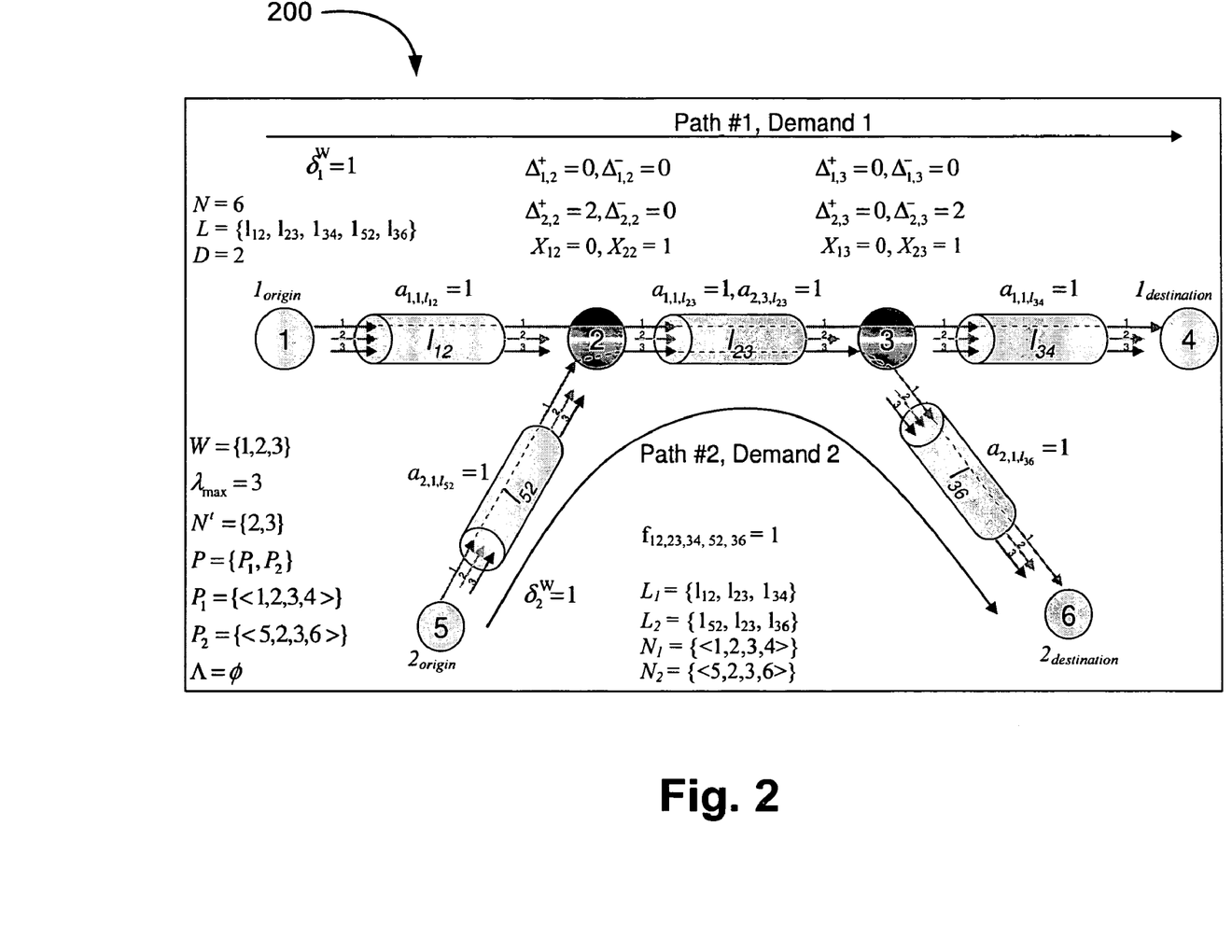
FIG. 2 is a diagram illustrating an exemplary system 200 in which the model formulation and the Mixed Integer Program may be applied.

FIG. 2 is a diagram illustrating an exemplary system 200 in which the model formulation and the MIP may be applied. FIG. 2 illustrates, among other things, exemplary variable values in correspondence to the model formulation described herein.

As illustrated, exemplary system 200 includes six network nodes (i.e., N=6). The set of nodes where wavelength translation can occur is $N^t=\{2, 3\}$. The set of physical links L include $\{l_{12}, l_{23}, l_{34}, l_{52}, l_{36}\}$, and the set of demands D is two (i.e., D=2). The set of <demand, wavelength> pairs showing demands that have pre-assigned wavelengths at the origin and destination nodes is zero (i.e., $\Lambda=\Phi$). In this example, W=\{1, 2, 3\}, representing three possible wavelength numbers on any of the fibers depicted in exemplary system 200. In this example, fiber cost $c_l$ for a link, and translation cost $c^t$ at a node, are not depicted. However, values assigned to these variables may be arbitrary. The maximum number of wavelengths per fiber, $\lambda_{max}$, is also three (i.e., $\lambda_{max}=3$).

FIG. 2 depicts $P_1$ having a path from origin node to destination node including $\{<1, 2, 3, 4>\}$ and $P_2$ having a path from origin node to destination node including $\{<5, 2, 3, 6>\}$. Thus, exemplary system 200 includes two paths, $P_1$ and $P_2$, so $P=\{P_1, P_2\}$. The set of links used in path 1 is $L_1=\{l_{12}, l_{23}, l_{34}\}$, and the set of links used in path 2 is $L_2=\{l_{52}, l_{23}, l_{36}\}$. The set of nodes used in path 1 is $N_1=\{<1, 2, 3, 4>\}$, and the set of nodes used in path 2 is $N_2=\{<5, 2, 3, 6>\}$.

In this example, working paths $P_1$ and $P_2$ correspond to decision variables $\delta_1^W$ and $\delta_2^W$, respectively. There are no protect paths. In one example, demand 1 (using path 1) may be assigned a wavelength 1, and demand 2 (using path 2) may be assigned a wavelength 3. As illustrated, the path, wavelength, and link assignments for each link are as follows $a_{1, 1, l12}=1$, $a_{1, 1, l23}=1$, $a_{2, 3, l23}=1$, $a_{1, 1, l34}=1$, $a_{2, 1, l52}=1$, and $a_{2, 1, l36}=1$. The number of fibers needed on a link may be 1 (i.e., $f_{12, 23, 34, 52, 36}=1$).

While not depicted for each node in exemplary system 200, the positive and negative difference between wavelength numbers coming in and out of node 2 for path 1 is $\Delta^+_{1,2}=0$, $\Delta^-_{1,2}=0$, while the positive negative difference between wavelength numbers coming in and out of node 2 for path 2 is $\Delta^+_{2,2}=2$, $\Delta^-_{2,2}=0$ (note that $\Delta^-_{2,2}$ may be calculated as negative two (−2), however, all variables are non-negative (i.e., see item 16 of the model formulation above)). The positive and negative difference between wavelength numbers coming in and out of node 3 for path 1 is $\Delta^+_{1,3}=0$, $\Delta^-_{1,3}=0$, while the positive and negative difference between wavelength numbers coming in and out of node 3 for path 2 is $\Delta^+_{2,3}=2$, $\Delta^-_{2,3}=0$. Further, for path 1 and path 2 at node 2, $X_{12}=0$, $X_{22}=1$, and for path 1 and path 2 at node 3, $X_{13}=0$, $X_{23}=1$.

In FIG. 2, directed links have been labeled as $l_{12}, l_{23}, l_{34} l_{52}$, and $l_{36}$. For path 1, $1_{origin}$=node 1 and $1_{destination}$=node 4, while for path 2, $2_{origin}$=node 5 and $2_{destination}$=node 4.

Although, FIG. 2 illustrates an exemplary configuration of nodes of system 200, in other instances, system 200 may include fewer, additional, and/or a different configuration than depicted in FIG. 2. Nevertheless, the principles described herein would equally apply.

Figure 3:
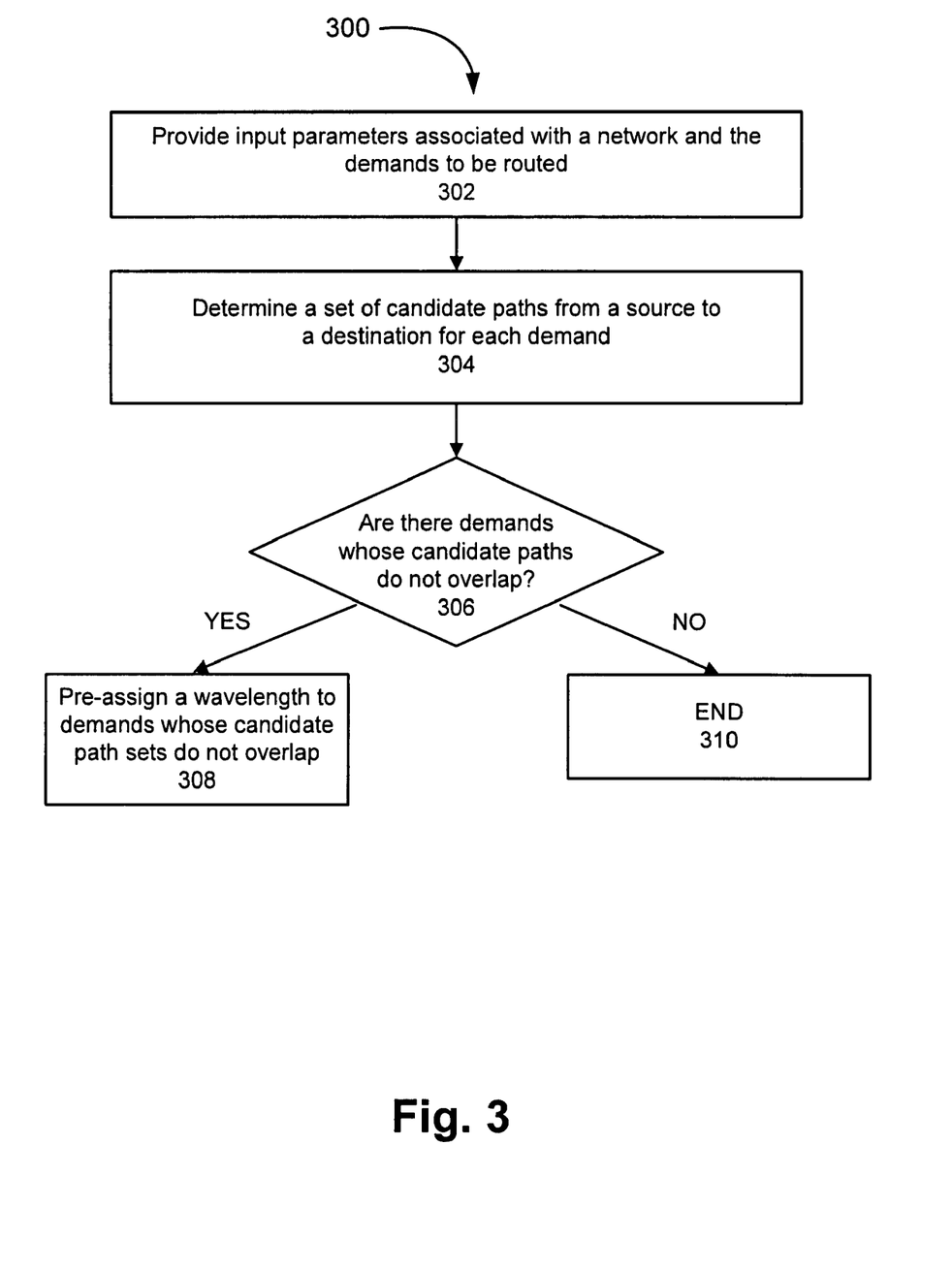
FIG. 3 is a flow diagram illustrating exemplary operations for wavelength assignment with minimal cost.

FIG. 3 is a flow diagram illustrating exemplary operations associated with a pre-processing procedure. That is, in one implementation, the exemplary pre-processing procedure may be employed before invoking the MIP. In some cases, the pre-processing procedure may reduce load and calculation time with respect to the MIP.

Process 300 may begin with providing input parameters associated with a network and the demands to be routed (Block 302). That is, parameters corresponding to the model formulation described herein may be provided. For example, network parameters, such as network topology, link costs and capacities, candidate nodes for wavelength translation, maximum number of wavelengths per fiber. Additionally, the demands to be routed may be provided.

As previously mentioned above, in one implementation, when the parameters are provided, the MIP may be invoked. However, in other implementations, the pre-processing procedure may be employed, as described herein.

In Block 304, a set of candidate paths from source to destination for each demand may be determined. For example, in one implementation, one or more candidate paths may be selected for each demand. When multiple candidate paths exist for a demand, each candidate path may be disjoint with every other candidate path.

In Block 306, a determination is made whether there are any demands whose candidate paths do not overlap. In some instances, the candidate paths associated with demands may be disjoint. In other instances, the candidate paths associated with demands may not be disjoint. When there are demands that may be disjoint (Yes—Block 306), a pre-assignment of wavelengths to these demands may be made (Block 308). An exemplary pre-assignment of wavelengths procedure (Block 308) is described below in reference to FIG. 4. Conversely, when there are no demands that may be disjoint (No—Block 306), the pre-processing procedure may end (Block 310). For example, the set of demands whose candidate paths overlap may be fed into the MIP program.

Although, FIG. 3 illustrates an exemplary pre-processing procedure, in other implementations, fewer, additional, or different processes may be performed. For example, a set of candidate paths for each demand may be determined (Block 304) and may be provided to the MIP without performing Block 306 and/or Block 308.

Figure 4:
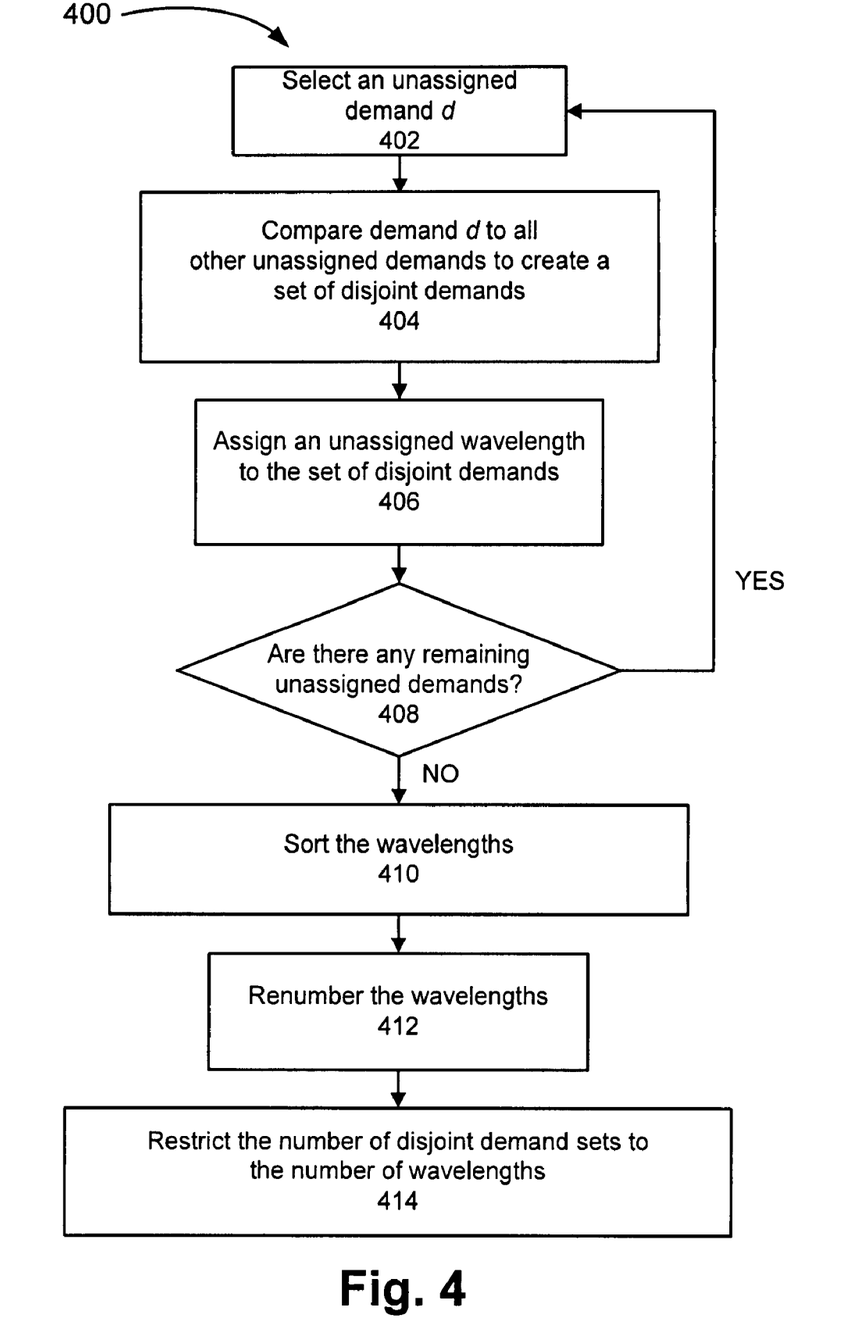
FIG. 4 is a flow diagram illustrating exemplary operations for performing wavelength pre-assignment.

FIG. 4 is a flow diagram illustrating exemplary operations for performing wavelength pre-assignment. In one implementation, process 400 may correspond to Block 308 depicted in FIG. 3.

Process 400 may begin with selecting an unassigned demand d (Block 402). As previously described for Block 304 in reference to FIG. 3, a demand may include one or more candidate paths. Candidate paths may be disjoint. In other instances, candidate paths may not be disjoint. For example, a demand may include two disjoint candidate paths and one non-disjoint candidate path. In Block 306, a set of demands may be created, where each demand includes disjoint candidate paths.

Given the above, for Block 402, an unassigned demand (i.e., a wavelength unassigned demand), such as unassigned demand d, may be selected from the set of demands. In some instances, a demand may have only one candidate path. In other instances, a demand may have multiple candidate paths.

In Block 404, a comparison between/among all other unassigned demands and unassigned demand d may be made to create a set of disjoint demands. For example, in one implementation, demand d may be compared to every other unassigned demand to determine what demands are disjoint with demand d. That is, each candidate path of demand d may be disjoint with each candidate path of another unassigned demand. Additionally, comparisons may be made to determine which demands are disjoint between/among each other, so that a set of demands that includes demands disjoint to demand d and disjoint with respect to each other may be created. For example, if demands 2, 6, and 8 are disjoint with respect to demand d, a comparison among demands 2, 6, and 8 may be made to ensure total disjointedness.

In Block 406, an unassigned wavelength may be assigned to the set of disjoint demands. For example, a wavelength w may be assigned to each unassigned demand that forms the set of disjoint demands. That is, each of the unassigned demands may utilize the same wavelength, such as wavelength w.

In Block 408, a determination may be made whether there are any remaining unassigned demands. When there are remaining unassigned demands (Yes—Block 408), Block 402 to Block 408 may be performed, as described herein. On the other hand, when there are no remaining unassigned demands (No—Block 408), a sorting of the wavelengths may be performed (Block 410).

In Block 410, the wavelengths assigned may be sorted. For example, the sorting may be based on the number of demands assigned to a wavelength. In one implementation, for example, the wavelength that is assigned to the greatest number of demands may be placed first in a list, and the remaining wavelengths may be placed in the list in decreasing order. In other words, the wavelength that is assigned to the disjoint demand set having the greatest number of demands would be sorted to the top of the list.

In Block 412, the wavelengths may be re-numbered. For example, the wavelength that is assigned to the greatest number of demands may be changed to the first available wavelength, such as a wavelength 1. The remaining wavelengths in the list may be assigned a wavelength 2, a wavelength 3, etc.

In Block 414, the number of disjoint demand sets may be restricted to the number of wavelengths. For example, depending on the number of disjoint demand sets and the number of wavelengths available, different scenarios may develop. In one instance, there may be forty (40) disjoint demand sets and fifty (50) wavelengths available to assign. In such an instance, to restrict the number of disjoint demand sets to the number of wavelengths may not be useful. In another instance, there may be fifty (50) disjoint demand sets and fifty (50) wavelengths available. In this case, since there are a sufficient number of wavelengths to be assigned to the disjoint demand sets, a restriction may not be useful. However, in some instances, there may be more disjoint demand sets than the number of wavelengths. In this case, it may be useful to restrict the number of disjoint demand sets for wavelength pre-assignment. For example, in the instance that there are forty (40) available wavelengths and fifty (50) disjoint demand sets, in one implementation, the first forty (40) disjoint demand sets may be pre-assigned to the forty (40) wavelengths. In this way, given the sorting of disjoint demand sets in Block 410, the maximum number of disjoint demands may have wavelength pre-assignment. The wavelength assignments for the last ten (10) disjoint demand sets of the fifty (50) disjoint demand sets may be handled by the MIP. For example, the MIP may then assign the wavelengths to the remaining ten (10) unassigned disjoint demand sets, as well as selecting the route for every demand of the fifty (50) disjoint demand sets (including working and protect route selection from the candidate set paths), selecting wavelength translation, etc.

Although, FIG. 4 illustrates an exemplary wavelength pre-assignment process, in other implementations, fewer, additional, and/or different processes may be performed. For example, in Block 404, other methods may be employed to create a set of demands that are disjoint. Additionally, other methods may be employed to sort the wavelengths and/or renumber the wavelengths.

Figure 5:
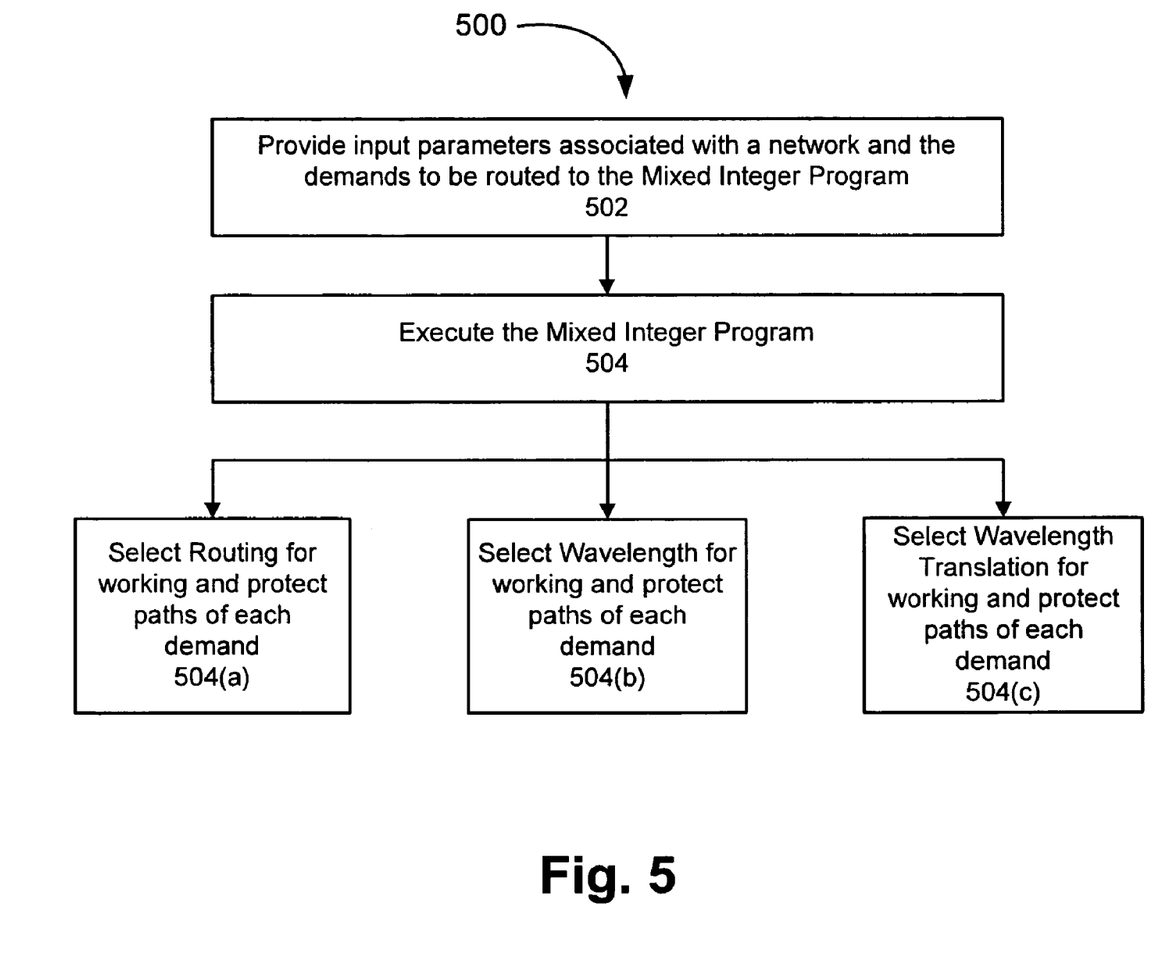
FIG. 5 is a flow diagram illustrating exemplary operations for utilizing the Mixed Integer Program.

FIG. 5 is a flow diagram illustrating exemplary operations for utilizing the Mixed Integer Program.

Process 500 may begin with providing input parameters associated with a network and the demands to be routed (Block 502). That is, parameters corresponding to the model formulation described herein may be provided. For example, network parameters, such as network topology, link costs and capacities, candidate nodes for wavelength translation, maximum number of wavelengths per fiber. Additionally, the demands to be routed may be provided. In one implementation, the input parameters and demands to be routed may be inputted into a computational device, such as a computer. In such an instance, the input parameters may be read from a file stored in a memory and/or entered by a person.

In Block 504, the MIP may be executed. For example, in one implementation, a computer may execute the MIP, as described herein, based on the input parameters and demands to be routed provided in Block 502. As described herein, the MIP may utilize equations (1) through (15) and item (16) to simultaneously select routing (Block 504($a$)), wavelength (Block 504($b$)), and wavelength translation (Block 504($c$)) for one or more demands, where each demand may include a working path and one or more protect paths. Since there may be some interdependence among equations (1) through (15) and item (16), as it relates to selecting routing, wavelength, and wavelength translation, a further description of this process is omitted.

In one example, the output from the MIP may provide a selection of routes for each demand, starting and ending wavelengths for each demand, nodes where wavelength translation occurs for each demand, wavelength used by each demand in every fiber of each link, total cost (e.g., transmission cost and translation cost), and statistics on path length. This information output from the MIP may be utilized to configure a network in an optimal way.

The foregoing description of implementations provides illustration, but is not intended to be exhaustive or to limit the implementations to the precise form disclosed. In this regard, the procedures described herein may have broader application. For example, although the above description relates to an optical network, in other implementations, a different type of network may be considered. For example, routing, channel, and translation sites (e.g., translation relating to protocol, address, or envelope (i.e., packet, frame, cell, etc.), etc.) of a wired or wireless network may correspond to the routing, wavelength, and wavelength translation sites of an optical network. Still further, for example, in a broader sense, any system designed to deliver a container from one point to another point may employ the teachings described herein. For example, the procedures described herein may have application in transportation systems (e.g., trains, airplanes, etc.). Accordingly, modifications and variations are possible in light of the above teachings or may be acquired from practice of the teachings.

In addition, while a series of blocks has been described with regard to processes illustrated in FIG. 3 and FIG. 4, the order of the blocks may be modified in other implementations. Further, non-dependent blocks may be performed in parallel.

It will be apparent that the exemplary model described herein may be implemented in many different forms of software, firmware, and hardware in the implementations illustrated in the figures. The actual software code or specialized control hardware used to implement the exemplary model does not limit the invention. Thus, the operation and behavior of the exemplary model were described without reference to the specific software code—it being understood that software and control hardware can be designed to implement the exemplary model based on the description herein.

Even though particular combination of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a", "an", and "the" are intended to include one or more items. Where only one item is intended, the term "one" or similar language is used. Further, the phrase "based on" is intended to mean "based, at least in part, on" unless explicitly stated otherwise. As used herein, the term "and/or" includes any and all combinations of one or more of the associated list items.

What is claimed is:

1. A method, comprising:

receiving, using a device, parameters that characterize an optical network, the received parameters including information identifying nodes for performing wavelength translation;

receiving, using the device, information associated with one or more first demands and one or more second demands, where each demand, of the one or more second demands, is disjoint with respect to any other demand in the one or more second demands;

assigning, based on information identifying a wavelength assignment, a first wavelength to at least one demand of the one or more second demands;

selecting, based on the received parameters and using the device, routes for the one or more first demands and the one or more second demands, second wavelengths for the one or more first demands and at least one other demand of the one or more second demands, and wavelength translation nodes for the one or more first demands and the one or more second demands, where each of the one or more first demands includes a working path and one or more protect paths, and where the wavelength translation nodes are selected from nodes identified in the information identifying the nodes for performing wavelength translation; and configuring, using the device, the optical network based on assigning the first wavelength to the at least one demand of the one or more second demands, the selected routes, the selected second wavelengths, and the selected wavelength translation nodes.

2. The method of claim 1, where the optical network includes a pre-existing wavelength assignment, and where configuring the optical network includes preserving the pre-existing wavelength assignment.

3. The method of claim 1, where the received parameters further include:

information identifying an optical network topology, link costs and capacities, and a maximum number of wavelengths per fiber, and where selecting the routes, the second wavelengths, and the wavelength translation nodes includes:

selecting the routes, the second wavelengths, and the wavelength translation nodes further based on the information identifying the optical network topology, the link costs and capacities, and the maximum number of wavelengths per fiber.

4. The method of claim 1, where selecting the routes, the second wavelengths, and the wavelength translation nodes comprises:

assigning the working path to be disjoint with respect to the one or more protect paths.

5. The method of claim 1, where selecting the routes, the second wavelengths, and the wavelength translation nodes comprises:

selecting, based on the received parameters, a common wavelength to be used at a source node and a destination node for each demand of the one or more first demands.

6. The method of claim 1, where selecting the routes, the second wavelengths, and the wavelength translation nodes comprises:

causing a same wavelength to enter and exit a non-translating node in the optical network.

7. The method of claim 1, where selecting the routes, the second wavelengths, and the wavelength translation nodes comprises:

evaluating changes in wavelength at a plurality of nodes included in the nodes for performing wavelength translation.

8. The method of claim 1, where selecting the routes, the second wavelengths, and the wavelength translation nodes comprises:

calculating a number of fibers needed per link.

9. The method of claim 1, where each demand, of the one or more second demands, includes at least two candidate paths that are disjoint.

10. The method of claim 1, further comprising:

receiving, from a user, information identifying the wavelength assignment, where assigning the first wavelength to the at least one demand of the one or more second demands includes:

assigning, based on the received information identifying the wavelength assignment, a common wavelength to a first quantity of the one or more second demands.

11. A computer-readable memory device comprising:

one or more instructions, which when executed by at least one processor, cause the at least one processor to receive parameters that characterize an optical network, the received parameters including information identifying sites to perform wavelength translation;

one or more instructions, which when executed by the at least one processor, cause the at least one processor to receive information associated with one or more first demands and one or more second demands, where each demand, of the one or more second demands, is disjoint with respect to any other demand of the one or more second demands;

one or more instructions, which when executed by the at least one processor, cause the at least one processor to receive information identifying a wavelength assignment;

one or more instructions, which when executed by the at least one processor, cause the at least one processor to assign, based on the information identifying the wavelength assignment, a first wavelength to at least one demand of the one or more second demands; and one or more instructions, which when executed by the at least one processor, cause the at least one processor to select based on the received parameters:
- routes for the one or more first demands and the one or more second demands,
- wavelength translation sites for the one or more first demands and the one or more second demands, and
- a second wavelength for the one or more first demands and at least one other demand of the one or more second demands, where the wavelength translation sites are selected from sites identified in the information identifying the sites to perform wavelength translation, and where the optical network is configured based on:
- the assigned first wavelength,
- the selected routes,
- the selected second wavelengths, and
- the selected wavelength translation nodes.

12. The computer-readable memory device of claim 11, further comprising:
one or more instructions to provide, based on the received parameters, information including a starting wavelength and an ending wavelength for each of the one or more first demands, transmission cost associated with each of the one or more first demands, and translation cost associated with each of the one or more first demands,
where the optical network is to be designed based on the provided information.

13. The computer-readable memory device of claim 11, where the one or more first demands include a demand having a pre-assigned wavelength for a first link from a source and for a last link to a destination.

14. The computer-readable memory device of claim 11, where the received parameters further include information identifying an optical network topology, link costs and capacities, and a maximum number of wavelengths per fiber, the computer-readable memory device further comprising:
one or more instructions to provide, based on the received parameters, information identifying a starting wavelength and an ending wavelength for each of the one or more first demands, a wavelength used by each of the one or more first demands in each fiber, and a statistic on path length associated with each of the one or more first demands,
where the provided information is used to implement changes to the optical network.

15. The computer-readable memory device of claim 11, where the one or more instructions to select the routes comprise:
one or more instructions to select a working path and a protect path for each of the one or more first demands, where the working path is shorter than the protect path, and where the routes are simultaneously selected for the working path and the protect path of each of the one or more first demands.

16. The computer-readable memory device of claim 11, where the one or more instructions to select the second wavelength comprise:
one or more instructions to select a common wavelength for each source and destination pair associated with the at least one demand of the one or more second demands.

17. The computer-readable memory device of claim 11, where the one or more instructions to assign the first wavelength comprise:
instructions to determine a set of candidate paths from a source to a destination for each of the one or more second demands.

18. The computer-readable memory device of claim 17, where the one or more instructions to assign the first wavelength further comprise:
instructions to compare each of the one or more second demands,
where the first wavelength is assigned based on a result of comparing each of the one or more second demands.

19. The computer-readable memory device of claim 11, where the one or more instructions to assign the first wavelength comprise:
one or more instructions to receive, from a user, information identifying wavelength assignments, the information identifying the wavelengths assignments including the information identifying the wavelength assignment;
one or more instructions to assign, based on the received information identifying the wavelength assignments, a plurality of wavelengths to a plurality of sets of demands associated with the one or more second wavelengths,
the computer-readable memory device further comprising:
one or more instructions to sort the assigned plurality of wavelengths based on a quantity of demands, of the plurality of sets of demands, assigned to each wavelength of the plurality of wavelengths; and
one or more instructions to number the assigned plurality of wavelengths based on sorting the assigned plurality of wavelengths,
where a particular wavelength, of the plurality of wavelengths, assigned a highest quantity of wavelengths with respect to quantities of wavelengths assigned to other ones of the plurality of wavelengths, corresponds to a first wavelength of the numbered plurality of wavelengths.

* * * * *